United States Patent Office 2,988,422
Patented June 13, 1961

2,988,422
BARIUM TITANATE
Robert J. Walsh, Dayton, Ohio, assignor to Monsanto Chemical Company, St. Louis, Mo., a corporation of Delaware
No Drawing. Filed Jan. 2, 1959, Ser. No. 784,473
9 Claims. (Cl. 23—51)

This invention relates to a method for the production of particulate compositions consisting essentially of barium titanate in finely-divided spheroidal form. It also relates to a process for the production of the said barium titanate composition.

It has been recognized that certain combinations of metal oxides have very useful electrical properties. One of the materials of this group of oxide combinations is barium titanate, particularly the meta-titanate compound, $BaTiO_3$. However, there has been no precise method available for the production of barium titanate, and in particular there has been no method available for the exact stoichiometric control of the composition of either the theoretical compound, $BaTiO_3$ or the non-stoichiometric compositions which may be desired to obtain specific electrical characteristics. The prior art method for the manufacture of this compound involves the calcination of a mixture of a barium compound, such as barium carbonate and a titanium compound such as titanium dioxide. The calcined mixture existing in the form of a sintered mass or clinker is then ground and recalcined. This procedure is repeated until an approximately homogeneous product is obtained. However, because of the difficulty of avoiding contamination during grinding and achieving complete chemical reaction between the two solid phases, it is usually found that there is great variation in various portions of a batch and that the reproducibility of electrical properties of this product is very poor.

It has now been found that barium titanate, both in the precise stoichiometric formula and in non-stoichiometric compositions, for example $Ba_{1.1}Ti_{0.9}O_3$ may readily be prepared with good reproducibility by a novel combustion process. In this process a finely-divided spray of a solution of a soluble barium compound and a solution of titanium lactate is fed to a heated zone, e.g. an externally heated hot tube, or preferably directly into a flame to produce barium titanate. It is preferred to introduce the two said components in a single solution, although individual solutions may also be employed. It is likewise a part of the invention to introduce doping elements, for example calcium compounds into the said feed solution or solutions which are to be utilized in the present flame combustion process. The doping elements serve to modify the dielectric constant, Curie point, loss factor and other properties.

The present process yields particles which are spheroidal in shape and which exhibit an unusual degree of uniformity as to particle size and as to the homogeneity of the said particles.

The barium titanate products of the present invention are characterized by an exceptionally high dielectric constant and are therefore of utility in the manufacture of capacitors. The ferroelectric properties are also excellent, so that this barium titanate may be used to advantage in computer storage units as well as in acoustic transducers exemplified by phonograph pickups, sonoar generators and sonar detectors.

In order to carry out the present process, solutions of soluble barium compound are prepared by dissolving the desired compounds, such as barium hydroxide, barium nitrate, or preferably a barium carboxylate in which the carboxylic radical has less than eight carbon atoms, such as barium formate, barium acetate, barium propionate, barium benzoate and barium salicylate, in water or in organic solvents or in mixtures of these. For this purpose the salts should be those which are readily soluble in the solvent to be used, which fact can readily be ascertained by reference to standard tables of solubility or if these be lacking by conducting simple solubility determinations in advance of the preparation of the solution. The titanium lactate is similarly prepared as a solution by dissolving this salt in water, organic solvents or a mixture of solvents. If it is desired, the titanium lactate may also be prepared from other starting materials by conducting the reaction in the said solvent and then employing the entire reaction mixture in solution as the starting material in the present process. Other additive metallic compounds which are desired in order to dope or modify the barium titanate may also be dissolved in either of the single or combination starting solutions, or may be prepared in a separate solution for use in the present process. Examples of such soluble modifying or doping compounds include calcium, strontium, zirconium, thorium, cerium, tin and silicon compounds which appear as oxides in the final product. The desired metals may be introduced into the system in the form of any soluble salt to prepare the said solution. If desired, all of the metal salts may be dissolved in the same solution.

The solvent should be chosen with regard to the particular salts which are available and the concentration of the salt desired, which in turn is dependent upon the fineness of particle which is to be prepared. Considerable latitude may be exercised in regard to the solvent employed, since a great many solvents in addition to water are available, from which a choice may be made. Foremost among the useful solvents are the lower alcohols, such as methyl, ethyl, propyl, isopropyl, butyl, isobutyl, and tertiary butyl alcohols. Ketones, such as acetate and methyl ethyl ketone or cyclic ethers, such as dioxane or related ethers may also be employed.

The flame is produced by combustion of the aforementioned organic solvent, if used, and/or combustible gases or vapors employing air, oxygen or mixtures thereof to maintain the flame. The combustible gases useful for this purpose are carbon monoxide, cyanogen, hydrogen, methane, ethane, ethylene, propane, propylene, butane, or the vapors of any of the liquid hydrocarbons derived from petroleum or coal sources. The atomization of the salt solution is effected by employing any standard liquid atomizing device which may be a pressure spray nozzle or a two-fluid nozzle which utilizes a high velocity gas jet to disperse the liquid. The nozzle is positioned so that the atomized "mist" of solution is projected into the flame. When a two-fluid atomizing nozzle is employed it is convenient to use part of the combustible gas and/or the oxidizing gas to atomize the solution.

The atomizing carrier gas, if used, may be employed in the minimum amount required to disperse the solution or may be used in excess, for example in the amount required for combustion in order to heat the mixture to reaction to obtain a flame temperature of from 800° to 1,600° C., a preferred range being from 1,000 C. to 1,400° C. for a period of time of 1 second to 0.001 second, a preferred range being from 0.5 second to 0.01 second. The flame temperature obtained during combustion will depend upon the relative proportions of combustible gas, oxidizing gas and atomized solution of salts fed into the flame and should be so controlled that the final product is burned substantially free of chemical elements (other than the metal oxide) which constituted the salts fed to the flame. It is obvious that the individual particles undergoing reaction may not reach as high a temperature as that of the flame, although it is desirable to measure the flame temperature as the most convenient method of control.

In the flame the finely-dispersed feed solution droplets are heated rapidly and uniformly and the following events are believed to occur in rapid succession: (1) the solvent evaporates; (2) the remaining salts, in an extremely finely-divided state, are decomposed to their respective oxides intimately mixed; (3) the resulting intimately mixed, finely-divided oxides react to form crystalline barium titanate. However, the present invention is not limited by any mechanism or hypothetical analysis of the actual process.

By the use of a long, insulated combustion chamber, it is possible to increase the residence time of the particles in the hot zone. In this way sufficient time can be provided for crystal growth and for completion of the relatively slow solid state reaction between the oxides. By adjustment of temperature and residence time it is possible to control the crystal size and the relative proportions of hexagonal and tetragonal barium titanate in the product. The particles leaving the hot zone are cooled by direct heat exchange and are then collected by suitable means such as a wet or dry cyclone separator, electro-static precipitator or a bag filter.

The preparation of the product is best carried out in a combustion or heating zone lined with refractory or insulating materials. When operating on a small scale in the laboratory a quartz tube has been found to form a satisfactory combustion zone. One end of the quartz tube was provided with a suitable nozzle for supplying atomized solution and also was equipped with a combustion gas burner. The other end of the quartz tube was connected to a water-cooled receptacle which in turn was connected with a collecting device for recovering the fine particles of the product.

*Example 1*

The preparation of barium titanate in substantially the stoichiometric proportion of $BaTiO_3$ was carried out by utilizing a solution of barium acetate containing 10% by weight of barium acetate (anhydrous basis) in water. The titanium source was anhydrous titanium lactate, also employed as a 10 weight percent solution in water. The two aqueous solutions were mixed and were then fed as a single solution to the flame combustion apparatus. The feed rate was 4.46 pounds per hour with the molar proportion of barium to titanium maintained substantially equal. The oxidation was conducted in a firebrick-lined combustion chamber to which the aqueous feed solution was fed through a parallel flow pneumatic atomizer utilizing the gas feed of methane as the atomizing medium. This portion of the gas feed was supplied at the rate of 6.97 pounds per hour, while the peripheral air feed was maintained at the rate of 194.3 pounds per hour in order to carry out the combustion of the feed gas and also to supply sufficient oxygen to bring about the oxidation of the organic portion of the feed salts used.

The formation of spherical particles of barium titanate was carried out by operating with a flame temperature of 1,257° C. as measured by a radiation shielded thermocouple. The reaction products leaving the oxidation zone of the flame were then passed downwardly through a water spray where they were rapidly cooled to 80° C. and then through an orifice scrubber in which the $BaTiO_3$ particles were scrubbed from the gas stream. The product was recovered from the resulting water slurry as a filter cake which was washed with fresh water and dried.

The product was obtained in the form of discrete particles which were spheroidal in shape and had an average diameter of 4 microns. The product was tetragonal in crystal form.

It has also been found that the present method makes it possible to control the proportion of tetragonal and hexagonal forms of barium titanate. Thus, the use of lower temperatures and shorter residence time in the flame result in the production of larger proportions of the hexagonal modification, while higher temperatures, and longer residence time result in the production of larger proportions of tetragonal barium titanate. In this way a product may be obtained which is substantially entirely in the tetragonal modification such as by operating at a temperature of about 1,400° C. On the other hand, it has been found that the use of a lower temperature such as 1,200° C. results in the production of a barium titanium product which contains 40% of the hexagonal modification and 60% of the tetragonal form of barium titanium.

What is claimed is:

1. Method for the production of barium titanate as spheroidal particles which comprises finely dispersing a solution of a soluble compound of barium, and a solution of titanium lactate into a heated zone at a temperature of from 1000° C. to 1400° C. to vaporize the said solutions, volatilizing the solvents from the said solutions and thermally decomposing the barium and titanium compounds to crystalline barium titanate.

2. Method for the production of barium titanate as spheroidal particles which comprises finely dispersing a solution of a carboxylate of barium in which the carboxyl radical has less than 8 carbon atoms, and a solution of titanium lactate into a flame at a temperature of from 1000° C. to 1400° C. to vaporize the said solutions, volatilizing the solvents from the said solutions and thermally decomposing the barium and titanium compounds to barium titanate.

3. Method for the production of barium titanate as spheroidal particles which comprises finely dispersing a solution of barium acetate and a solution of titanium lactate into a flame at a temperature of from 1000° C. to 1400° C. to vaporize the said solutions, volatilizing the solvents from the said solutions and thermally decomposing the barium and titanium compounds to barium titanate.

4. Method for the production of barium titanate as spheroidal particles which comprises finely dispersing a solution of a soluble compound of barium and a solution of titanium lactate into a flame at a temperature of from 1000° C. to 1400° C. to vaporize the said solutions, vaporizing the solvents from the said solutions, and thermally decomposing the barium and titanium compounds to barium titanate.

5. Method for the production of barium titanate as spheroidal particles which comprises finely dispersing a solution of a carboxylate of barium in which the carboxyl radical has less than 8 carbon atoms, and a solution of titanium lactate into a flame, vaporizing the solvents from the said solutions, and thermally decomposing the barium and titanium compounds to barium titanate.

6. Method for the production of barium titanate as spheroidal particles which comprises finely dispersing a solution of barium acetate and a solution of titanium lactate into a flame at a temperature of from 1000° C. to 1400° C., vaporizing the solvents from the said solutions, and thermally decomposing the barium and titanium compounds to barium titanate.

7. Method for the production of barium titanate as spheroidal particles which comprises finely dispersing an aqueous solution of a soluble compound of barium and an aqueous solution of titanium lactate into a flame having a flame temperature of from 800° C. to 1,600° C., volatilizing water from the said solutions, and thermally decomposing the barium and titanium compounds to barium titanate.

8. Method for the production of barium titanate as spheroidal particles which comprises finely dispersing an aqueous solution of a carboxylate of barium in which the carboxyl radical has less than 8 carbon atoms and an aqueous titanium lactate into a flame having a flame temperature of from 800° C. to 1,600° C., volatilizing water from the said solutions, and thermally decomposing the barium and titanium compounds to barium titanate.

9. Method for the production of barium titanate as spheroidal particles which comprises finely dispersing an aqueous solution of barium acetate, and an aqueous solution of titanium lactate into a flame having a flame temperature of from 800° C. to 1,600° C., volatilizing water from the said solutions, and thermally decomposing the barium and titanium compounds to barium titanate.

References Cited in the file of this patent

UNITED STATES PATENTS

| | | |
|---|---|---|
| 760,319 | Dreher | May 17, 1904 |
| 1,843,012 | Bucherer | Jan. 26, 1932 |
| 2,695,240 | Oshry | Nov. 23, 1954 |
| 2,758,911 | Lynd et al. | Aug. 14, 1956 |

FOREIGN PATENTS

| | | |
|---|---|---|
| 811,425 | Great Britain | Apr. 8, 1959 |

OTHER REFERENCES

Flaschen article in Journal of the American Chemical Society, vol. 77 (1955), page 6194.